United States Patent
Nychka et al.

(10) Patent No.: US 7,809,889 B2
(45) Date of Patent: Oct. 5, 2010

(54) HIGH PERFORMANCE MULTILEVEL CACHE HIERARCHY

(75) Inventors: Robert Nychka, Canton, TX (US); Janardan Prasad, Bangalore (IN); Nilesh Acharya, Maharashtra (IN); Aditya Rawal, New Delhi (IN); Ambar Nawaz, Madhya Pradesh (IN)

(73) Assignee: Texas Instruments Incorporated, Dallas, TX (US)

(*) Notice: Subject to any disclaimer, the term of this patent is extended or adjusted under 35 U.S.C. 154(b) by 555 days.

(21) Appl. No.: 11/779,784

(22) Filed: Jul. 18, 2007

(65) Prior Publication Data

US 2009/0024796 A1 Jan. 22, 2009

(51) Int. Cl.
*G06F 12/08* (2006.01)
(52) U.S. Cl. .................... 711/122; 711/119
(58) Field of Classification Search ......... 711/122, 711/118, 119, 120
See application file for complete search history.

(56) References Cited

U.S. PATENT DOCUMENTS

| | | | |
|---|---|---|---|
| 6,237,064 B1 | 5/2001 | Kumar | |
| 6,446,166 B1 * | 9/2002 | Arimilli et al. | 711/122 |
| 7,293,141 B1 * | 11/2007 | Donley | 711/118 |
| 2001/0010069 A1 * | 7/2001 | Hetherington et al. | 711/122 |
| 2003/0154345 A1 * | 8/2003 | Lyon | 711/122 |

* cited by examiner

*Primary Examiner*—Pierre-Michel Bataille
(74) *Attorney, Agent, or Firm*—Ronald O. Neerings; Wade James Brady, III; Frederick J. Telecky, Jr.

(57) ABSTRACT

A digital system is provided with a hierarchical memory system having at least a first and second level cache and a higher level memory. If a requested data item misses in both the first cache level and in the second cache level, a line of data containing the requested data is obtained from a higher level of the hierarchical memory system. The line of data is allocated to both the first cache level and to the second cache level simultaneously.

16 Claims, 6 Drawing Sheets

HIGH PERFORMANCE MULTILEVEL CACHE HIERARCHY

FIELD OF THE INVENTION

This invention generally relates to microprocessor memory systems including a cache, and in particular to multilevel cache hierarchy.

BACKGROUND OF THE INVENTION

Historically, the performance of computer systems has been directly linked to the efficiency by which data can be accessed from memory, often referred to as the memory access time. Generally, the performance of a central processing unit (CPU or microprocessor), which functions at a high speed, has been hindered by slow memory access times. Therefore, to expedite the access to main memory data, cache memories have been developed for storing frequently used information.

A cache is a relatively small high-speed memory that is used to hold the contents of the most recently utilized blocks of main storage. A cache bridges the gap between fast processor cycle time and slow memory access time. Using this very fast memory, the microprocessor can reduce the number of wait states that are interposed during memory accesses. When the processor issues a read instructions to the cache, the cache checks its contents to determine if the data is present. If the data is already present in the cache (termed a "hit"), the data is forwarded to the CPU with practically no wait. If, however, the data is not present (termed a "miss"), the cache must retrieve the data from a slower, secondary memory source, which may be the main memory or another cache, in a multi-level cache hierarchy. In addition, the retrieved information is also copied (i.e. stored) into the cache memory so that it is readily available to the microprocessor for future use.

Most cache memories have a similar physical structure. Caches generally have two major subsystems, a tag subsystem (also referred to as a cache tag array) and memory subsystem (also known as cache data array). A tag subsystem holds address information and determines if there is a match for a requested datum, and a memory subsystem stores and delivers the data upon request. Thus, typically, each tag entry is associated with a data array entry, where each tag entry stores an upper portion of the address relating to each data array entry. Some data processing systems have several cache memories in a multi-level cache hierarchy, in which case each data array will have a corresponding tag array to store addresses.

To speed up memory access operations, caches rely on principles of temporal and special locality. These principles of locality are based on the assumption that, in general, a computer program accesses only a relatively small portion of the information available in computer memory in a given period of time. In particular, temporal locality holds that if some information is accessed once, it is likely to be accessed again soon, and spatial locality holds that if one memory location is accessed then other nearby memory locations are also likely to be accessed. Thus, in order to exploit temporal locality, caches temporarily store information from a slower-level memory the first time it is accessed so that if it is accessed again soon it need not be retrieved from the slower-level memory. To exploit spatial locality, caches transfer several blocks of data from contiguous addresses in slower-level memory, besides the requested block of data, each time data is written in the cache from slower-level memory.

Utilizing a multi-level cache memory hierarchy can generally improve the proficiency of a central processing unit. In a multi-level cache infrastructure, a series of caches L0, L1, L2 or more can be linked together, where each cache is accessed serially by the microprocessor. For example, in a three-level cache system, the microprocessor will first access the fast L0 cache for data, and in case of a miss, it will access slower cache L1. If L1 does not contain the data, it will access the slower but larger L2 cache before accessing the main memory. Since caches are typically smaller and faster than the main memory, the general trend is to design computer systems using a multi-level cache hierarchy.

In a multilevel cache system various latencies are typically incurred when a miss occurs due to the time it takes to provide new data to each level of the multilevel hierarchy.

SUMMARY OF THE INVENTION

An embodiment of the present invention provides reduced cache hierarchical latency by allocating a line of data to both a first cache level and to a second cache level simultaneously after detecting a miss in both levels.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
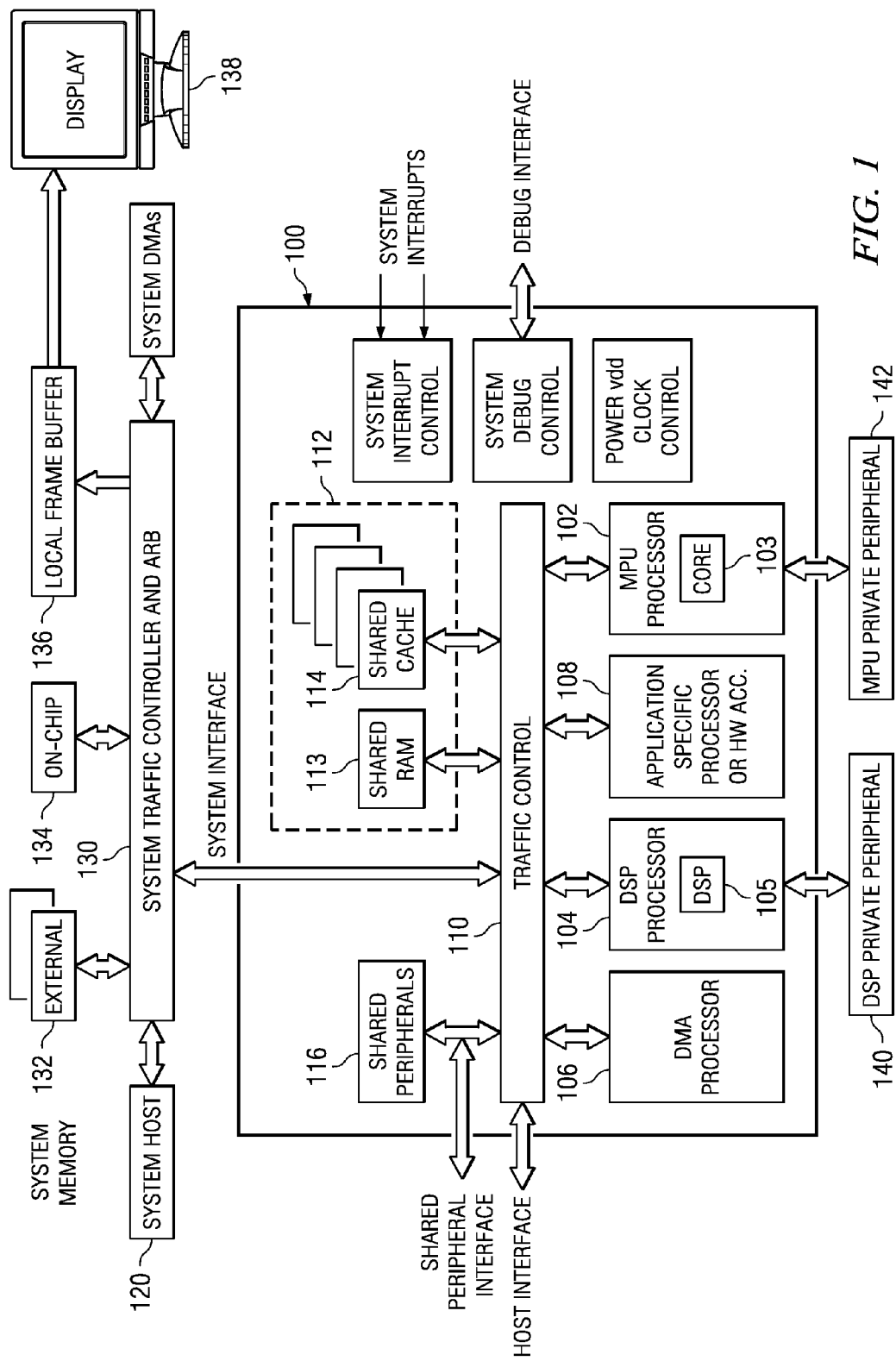
FIG. 1 is a block diagram of a digital system that includes an embodiment of the present invention in a megacell having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 6,658,578 issued to Gilbert Laurenti, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, digital system 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from control processor 102 and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Certain embodiments may also have a host processor 120 that interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

One skilled in the art will realize many variations of a digital system are possible and my include fewer items than illustrated in FIG. 1, or may include additional items. For example, there may be only a single processor, more or fewer peripherals, various configurations of memory, etc. The megacell 100 could, for example, contain a general microprocessor rather than a DSP and could be implemented in technologies other than ASIC technology. The processor or a megacell including the processor could be implemented in one or more integrated circuits, etc.

Figure 2:
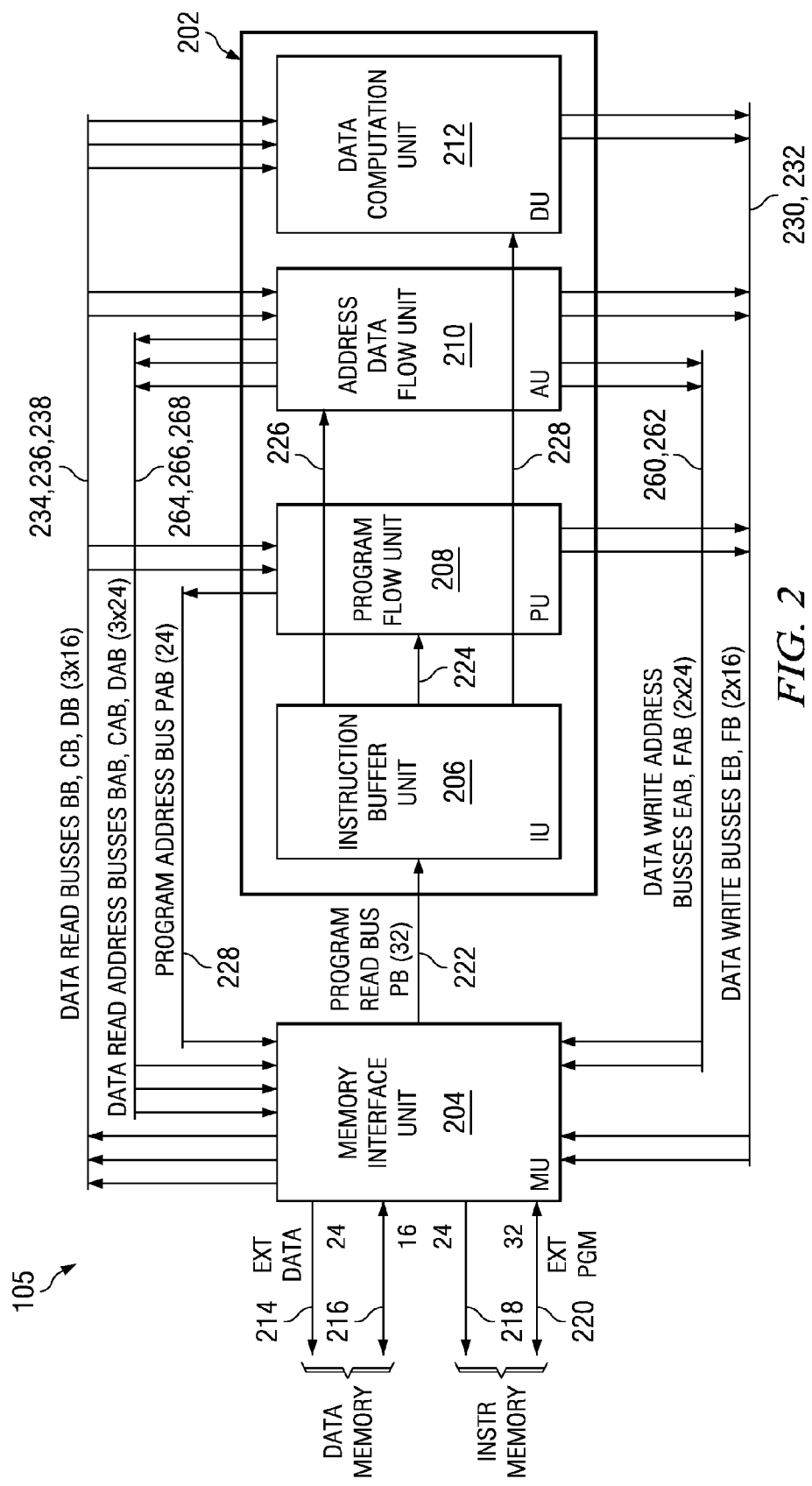
FIG. 2 is a schematic diagram of a processor core of the megacell of FIG. 1.

FIG. 2 is a schematic diagram of a processor core 105 of the megacell of FIG. 1. As shown in FIG. 2, an embodiment of the invention includes a memory interface unit 204 which is coupled to external memory units via a 24 bit address bus 214 and a bi-directional 16 bit data bus 216. Additionally, the memory interface unit 204 is coupled to program storage memory (not shown) via a 24 bit address bus 218 and a 32 bit bi-directional data bus 220. The memory interface unit 204 is also coupled to the I Unit 206 of the machine processor core 202 via a 32 bit program read bus (PB) 222. Within memory interface unit 204 there is both an instruction cache and a separate data cache. The P Unit 208, A Unit 210 and D Unit 212 are coupled to the memory interface unit 204 via data read and data write buses and corresponding address buses. The P Unit 208 is further coupled to a program address bus 228.

More particularly, the P Unit 208 is coupled to the memory interface unit 204 by a 24 bit program address bus 228, the two 16 bit data write buses (EB, FB) 230, 232, and two of the 16 bit data read buses (CB, DB) 234, 236. The A Unit 210 is coupled to the memory interface unit 204 via the two 24 bit data write address buses (EAB, FAB) 260, 262, the two 16 bit data write buses (EB, FB) 230, 232, the three data read address buses (BAB, CAB, DAB) 264, 266, 268 and two 16 bit data read buses (CB, DB) 234, 236. The D Unit 212 is coupled to the memory interface unit 204 via the two data write buses (EB, FB) 230, 232 and three data read buses (BB, CB, DB) 238, 234, 236.

Processor core 105 is organized around a unified program/data space. A program pointer is internally 24 bit and has byte addressing capability, but only a 22 bit address is exported to memory since program fetch is always performed on a 32 bit boundary.

Figure 3:
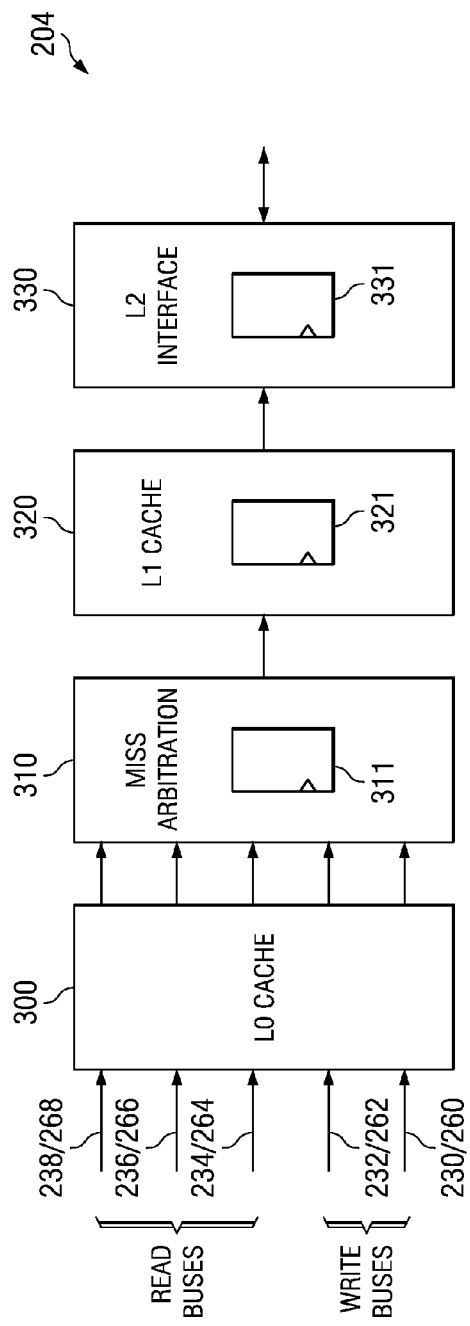
FIG. 3 is a block diagram of cache level 0 and cache level 1 of a hierarchical memory system provided in the digital system of FIG. 1.

FIG. 3 is a block diagram of data cache level 0 (L0) and data cache level 1 (L1) of a hierarchical memory system provided in the digital system of FIG. 1. The L0 and L1 data cache are embodied within memory interface unit 204 of CPU core 105 illustrated in FIG. 2. As mentioned earlier, a separate instruction cache is also embodied within memory interface unit 204. CPU core 103 may also have an embedded L0/L1 cache and share the L2 cache 112. In other embodiments, CPU core may have a different cache configuration, such as only an L1 cache, and may or may not share the L2 cache.

L0 cache 300 receives the three read buses 234/264, 236/266 and 238/268 for accessing data that is cached within L0 300 in response to read requests provided on the three read buses. In this embodiment, L0 300 is embodied as seven lines of fully associative cache, where each line can be accessed be each of the three read buses. Each line is 256 bits. Other embodiments of L0 may be larger or smaller, and have a different associative organization. In this embodiment, L1 cache 320 is a 2-way set associative cache with a total capacity of 16 kb. Each line of L1 320 is also 256 bits. Of course, in other embodiments the L1 cache may have a different size or organization. Any requests received on the three read buses that does not hit in L0 300 are sent to arbitrator 310 which prioritizes the requests for access in L1 320. Each request that does not hit in L1 320 is then sent to L2 interface 330 and is then forwarded to level 2 memory system 112. Pipeline stages 311, 321 and 331 pipeline the read requests through arbitrator 310, L1 cache 320 and L2 interface 330 respectively.

Write buses 230/260 and 232/262 provide write requests that may hit in L0 300 or be staged by pipeline stage 311 and 321 for writing into L1 320 after being arbitrated if an L1 hit is determined. If an L1 miss occurs, then the write request is staged in pipeline stage 331 for writing to L2 112.

A control register (not shown) is provided which can be manipulated by software operating on CPU core 105 in order to select various modes of operation. For some types of program operation, L0 may be disabled and only L1 used. Write operations may be designated to operate in write-through or in write-back mode. Write operations can also be designated to cause an allocation in the L0/L1 cache if a miss occurs on a write, or be designated to not cause an allocation on a write miss. In this embodiment, both L0 300 and L1 320 are controlled as a single entity by the control register. Therefore, regardless of whether L0 is enabled or not, the L0-L1 unit can be controlled with the same control software.

When L0 is disabled, CPU read and write buses are arbitrated in arbitrator 310 for generation of a single access to the L1 cache with a zero wait state access. Each miss is sent to L2 interface 330 for access to the upper level L2 memory system.

When L0 is enabled, if a read request miss occurs in L0 it is forwarded to the L1 cache. If a hit occurs in the L1 cache, a ready indicator is returned to the CPU and data is provided on the requesting read bus on the next clock cycle. Simultaneously, an entire line is allocated in the L0 cache by evicting a current L0 line.

In this embodiment, the style of write operation can be selected to be either write-through or write-back. If write-through operation is selected, then each write request is propagated immediately to backing memory L2 even if a hit occurs. However, if write-back operation is selected, then when a hit occurs in L1 cache the backing L2 memory is not updated until the line is evicted from the L1 cache. A dirty tag bit associated with each line of the cache indicates the presence of "dirty" data that needs to be written back to backing L2 memory. When operating in write-through mode, dirty bits are not asserted when a hit occurs because the data in the cache line as well as in backing memory is updated.

When write-back operation with cache allocation is selected, if a miss occurs in L0 but a hit occurs in L1 for the requested address, then the L1 line is copied down to the L0 cache with the write data inserted in the corresponding 16-bit location of the 256-bit line and the L1 line is marked as dirty. If the write-back with allocation request misses in both the L0 cache and the L1 cache, then a line must be allocated in both L0 and L1 of the cache hierarchy, which will be described with respect to FIG. 6. If the write back request hits in L0, it is not forwarded to L1 and the L0 line is indicated to be dirty by a tag bit associated with each cache line.

When an allocation occurs in L0, a line must be evicted. If the line contained dirty data from a prior write-back request and if the line is not present in L1, then the line must be written back to upper level memory. When the L0 line eviction occurs, the line is transferred to a victim buffer (not shown) and forwarded to L1. If a hit occurs in L1, then the L1 line is updated and the L1 dirty bit is set. If a miss occurs in L1, then the evicted line is forwarded to the L2 higher level memory. A miss in L1 does not cause any allocation in L1 because evictions in this embodiment are write-back with no allocation.

In the case where a write-back or a write-through with no allocate misses in both the L0 cache and in the L1 cache, the write request is forwarded to the L2 backing memory where the memory will be updated. Neither L0 nor L1 will contain the write data.

Figure 4:
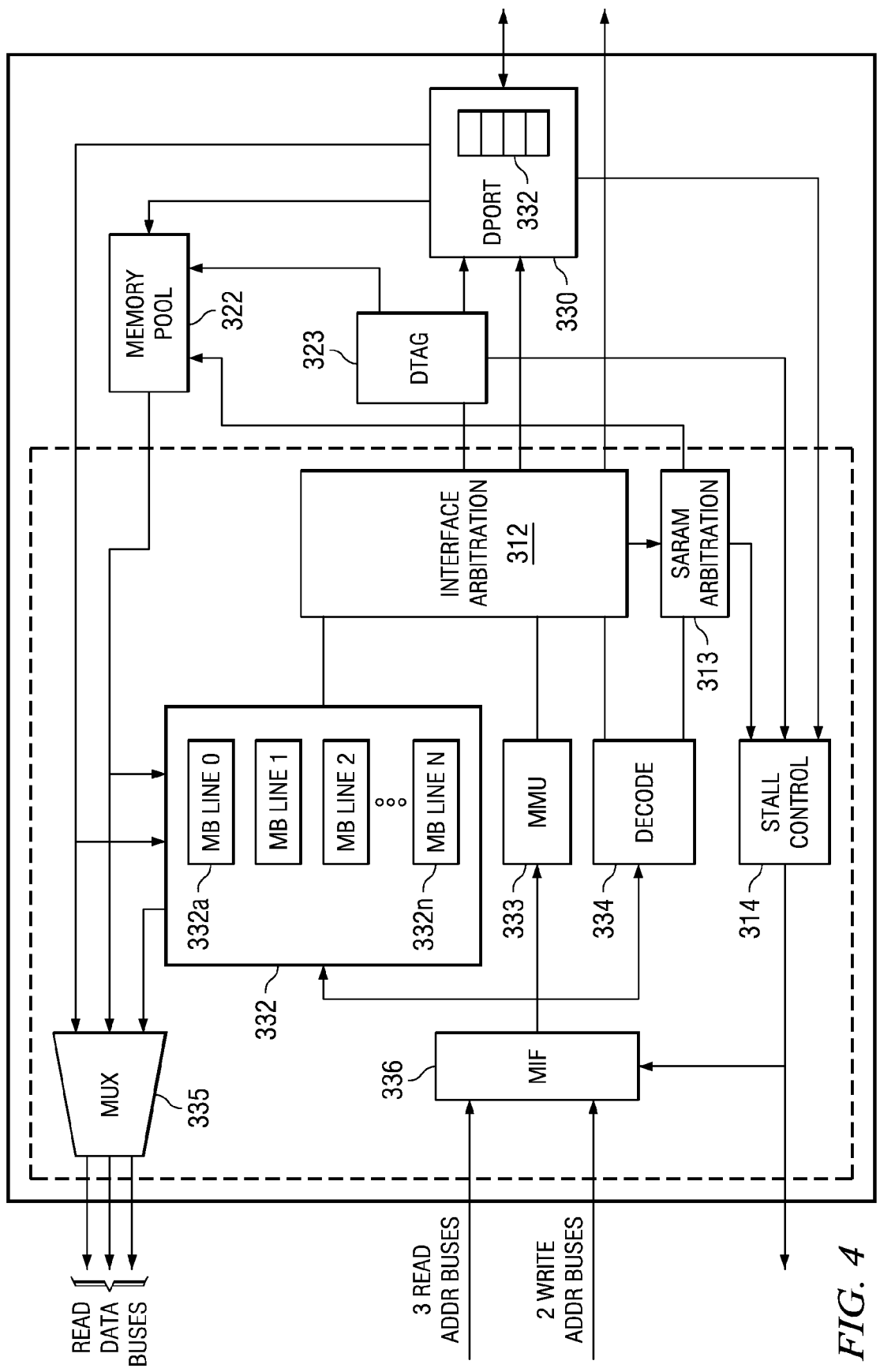
FIG. 4 is a more detailed block diagram of the L0/L1 cache of FIG. 3.

FIG. 4 is a more detailed block diagram of the L0/L1 cache of FIG. 3. Register array 332 embodies the seven lines of 256 bits. Each line may be accessed and provide read data to any of the three read buses 234, 236, 238 via mux 335. In this embodiment, each multiple bus line (MB line) 332a-332n can be accessed independently by any one of the three read buses so that three read requests may be satisfied on the same clock cycle if all three accesses hit.

Memory Management Unit (MMU) 333 provides logical to physical address translation for each of the three read address buses and the two write address buses via interface 336. MMU 333 also includes tag bits to indicate various properties of the cached data, including if data in a particular address range is cacheable. Decoder 334 observes all five address buses and provides decoding to determine when a hit occurs in L0 for any of the five address busses. Decoder 334 also provides sequential address detection that is used by interface arbitration circuitry 312 of arbitrator 310 to determine when a stream of sequential addresses are provided in any sequence of read or write requests. The detection of sequential addresses indicate a high likelihood of locality of reference for a stream of accesses that is used to embody an eviction policy for the L0 and L1 caches.

SARAM (Single Access Random Access Memory) arbitrator 313 determines which data item is going to be returned when several requests are queued to memory pool 322 of L1 cache 320. Memory pool 322 is embodied with various blocks of configurable memory that may have different wait state access times. Dtag (data cache tag) 323 holds the upper portion of addresses of data that is cached in memory pool 322, as is typically done in two-way set associative caches. L2 interface 330 includes a fill buffer 332 that holds four 64-bit words at a time. Each access to L2 memory 112 returns a 64-bit word of data.

Figure 5:
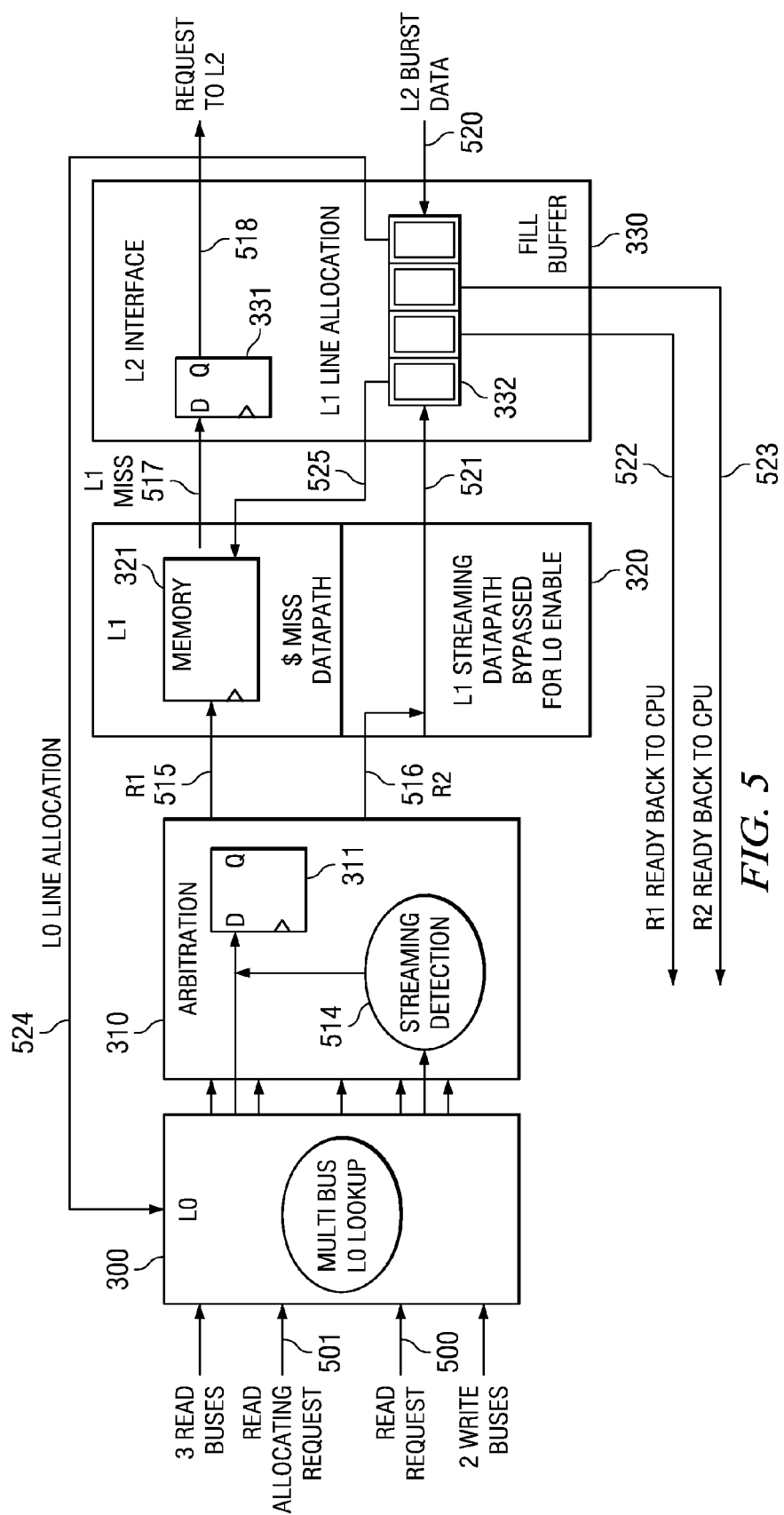
FIG. 5 is a flow diagram illustrating operation of a shared fill buffer in the L0/L1 cache of FIG. 3.

FIG. 5 is a flow diagram illustrating operation of a shared fill buffer in the L0/L1 cache of FIG. 3. Certain types of read accesses 500 do not cause an allocation in L0 as indicated by tag bits of MMU 333. Write requests generally do not cause an allocation in L0, but this embodiment does allow write accesses to be configured under control a control register to be allocated in L0. In order to reduce thrashing in L0, a line is allocated only when a streaming sequence of requests is detected. When a read allocating request 501 is received by L0 300, the fully associative address registers (not shown) are compared against the address of the read request to determine if a hit occurs. Note, in this embodiment up to three read requests and two write requests may be processed for an L0 hit simultaneously. If read allocating read request 501 misses in L0, a request R1 515 is forwarded to L1 320 once it has been selected by arbitrator 310 for processing. If a subsequent read request is received at L0 that has a sequential address, then streaming detection circuitry 514 detects this condition and enables a line allocation in L0. Selection of a line to evict is based on a predetermined eviction policy. Note, streaming can be detected based on a pair of read requests from the same one of the three read buses, or may be detected based on a pair of read requests from different read buses.

If the R1 515 request also misses in L1, then an L1 misses request 517 is sent to L2 interface 330. After being staged in pipeline stage 331, the request is sent 518 to L2 112. In order to allocate a cache line, 256 bits of data must be obtained. To do that, a burst request of four 64 bit words from L2 112 is generated. However, in order to reduce latency, a word containing the requested missing data is requested first, then the other three words are burst fetched 520 in a round robin fashion so that a complete 256-bit address-aligned set of data is obtained. The first requested 64-bit word of data is placed in one of the four slot of fill buffer 332 in accordance with its least significant address bits.

If streaming was detected 514 on a subsequent request, then this subsequent request R2 516 bypasses L1 and is sent 521 directly to fill buffer 332 since it has already been determined that L1 does not contain a cache line that holds this data. Similarly, no L1 cache lookup is performed for streaming request R2 516.

Once the first word of the burst request is received in fill buffer 332, a ready signal and data is returned 522 to the CPU in to fulfill request R1. If the second request R2 is on the same read bus, then a ready signal and data is returned 523 on the next clock cycle. If the R2 request was on a different read bus, then R1 and R2 can be returned 522, 523 on the same clock cycle.

After all four 64-bit words have been received into the correct address aligned slots of fill buffer 332, the entire 256-bit line is allocated 524 in L0 300 and also allocated 525 into L1 320 simultaneously on the same clock cycle. In this manner, the normal L0/L1 fill latency is avoided.

Figure 6:
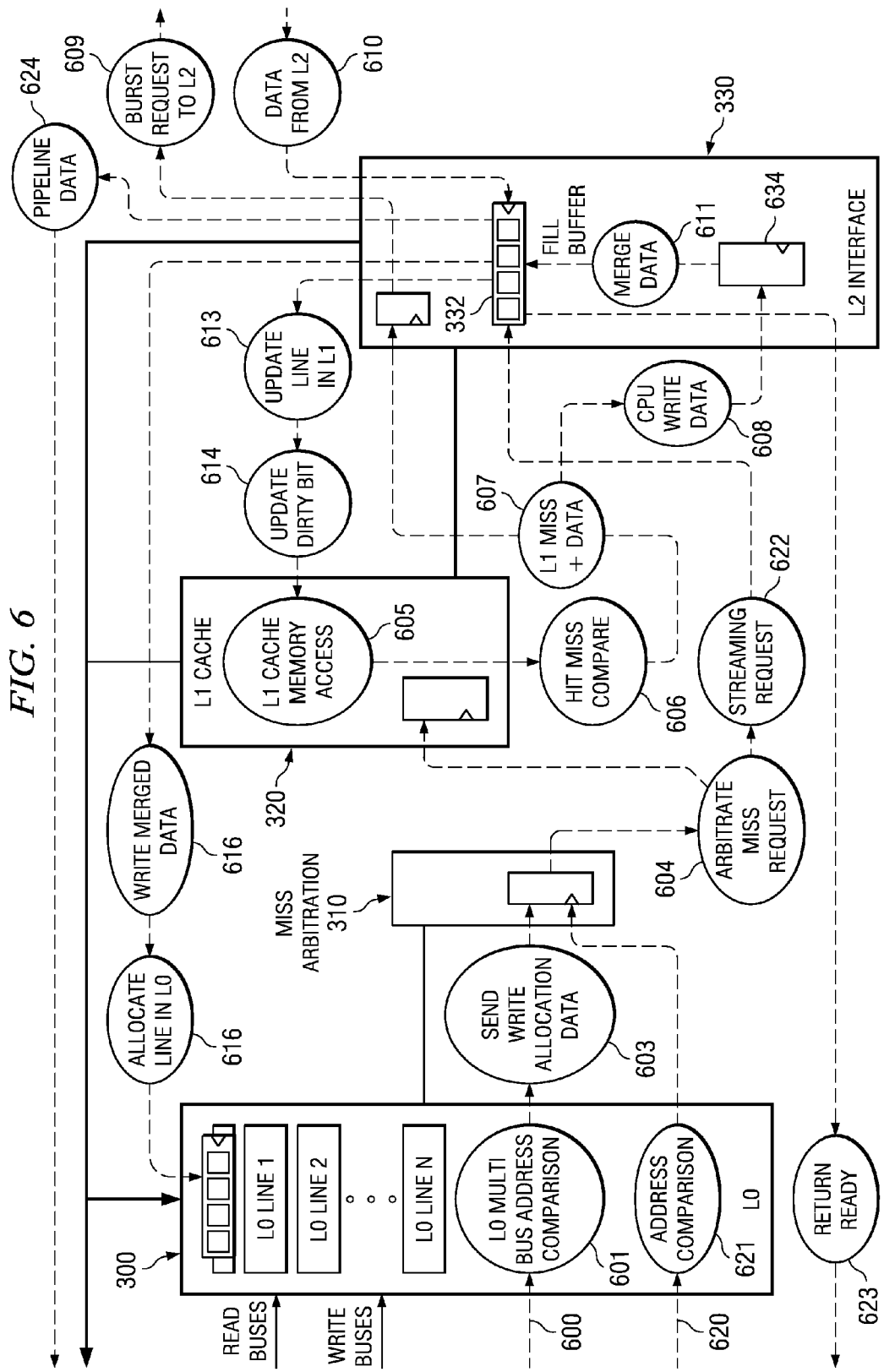
FIG. 6 is a flow diagram illustrating a cache allocation scheme for write misses in the L0/L1 cache of FIG. 3.

FIG. 6 is a flow diagram illustrating a cache allocation scheme for write misses in the L0/L1 cache of FIG. 3. As was mentioned earlier, cache allocation on writes is configurable in this embodiment. If the write-back with allocation request misses in both the L0 cache and the L1 cache, then a line must be allocated throughout the entire L0/L1 cache hierarchy. Each write request 600 received in the L0 cache has its address compared 601 to each of the multiple lines to determine if a hit occurs. Simultaneously, MMU 333 is checked to determine if the write request address is in a cacheable region by decoding which region is being accessed. If the request misses in L0 and is in a cacheable region it is sent 603 to arbitrator 310 for arbitration. Once the write request is selected by arbitration 604, it is sent to L1 Dtag 323 which is accessed 605 and compared 606 to the write request address to determine if an L1 hit occurs. If a miss occurs, the write data is sent 608 to a write data buffer 634 in L2 interface 330 and held while a read burst request is sent 609 to L2 memory. As the data from the burst request is returned 610, it is loaded into the corresponding slot in fill buffer 332.

While the burst request is being satisfied, subsequent read requests 620 may be received on any of the three read request busses. These are compared 621 to the pending write request to determine if it is within the same line; if it is it is treated as a streaming request. A streaming request 622 will be indicated as ready 623 and the requested data will be returned 624 on the corresponding read buss from fill buffer 332 as soon as the corresponding word is received into fill buffer 332.

Once the fill buffer is filled with the burst data to form a complete 256-bit cache line, the write data being held in write data buffer 634 is merged 611 into the fill buffer at the corresponding address location. Once write data is merged with the line fill buffer, the entire line is allocated 613 to the L1 cache and also allocated 615 to the L0 cache simultaneously on the same clock cycle. The L1 dirty bits 614 and the L0 dirty bits 616 are updated to indicate the corresponding cache lines contain dirty data that must be written out upon eviction. By allocating the line to both L0 cache and L1 cache simultaneously, cache fill latency is reduced.

Digital System Embodiment

Figure 7:
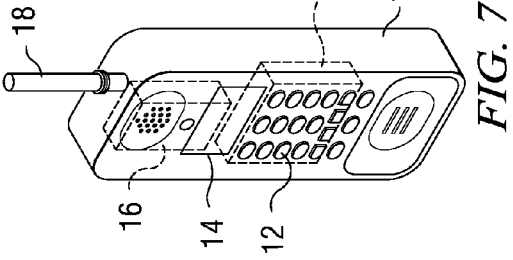
FIG. 7 is an illustration of a cell phone that includes an embodiment the digital system of FIG. 1.

FIG. 7 illustrates an example an integrated circuit as described above used in a mobile telecommunications device, such as a mobile telephone with integrated keyboard 12 and display 14. As shown in FIG. 7, digital system 100 according to FIG. 1 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As access time is also of concern in desktop and line-powered computer systems and micro-controller application, it is also contemplated that the present invention may also provide benefits to such line-powered systems.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false. References to storing or retrieving data in the cache refer to both data and/or to instructions.

While the invention has been described with reference to illustrative embodiments, this description is not intended to be construed in a limiting sense. Various other embodiments of the invention will be apparent to persons skilled in the art upon reference to this description. For example, in another embodiment, the cache memory may be a simple cache that does not include multi-set associativity. The cache pair may be positioned at a level other than L0/L1. Each cache may have a different set organization with a different number of segments per line, for example. For even more fine grained cache hierarchies, simultaneous line allocations may be applied to three or more cache levels.

It is therefore contemplated that the appended claims will cover any such modifications of the embodiments as fall within the true scope and spirit of the invention.

What is claimed is:

1. A digital system having a hierarchical memory system comprising:
   a level 0 cache;
   a level 1 cache connected to the level 0 cache;
   a level 2 memory connected to the level 1 cache;
   a fill buffer connected to receive a line of data from the level 2 memory and to allocate the line of data to the level 0 cache and to the level 1 cache simultaneously; and
   streaming circuitry connected to the level 0 cache, the streaming circuitry operable to, when both a first data request from the CPU and a second data request from the CPU are contained within the line of data, provide the second requested data to a requester prior to allocating the line of data.

2. The digital system of claim 1, further comprising a central processing unit (CPU) connected to the level 0 cache, wherein the line of data is obtained from the level 2 memory in response to a request from the CPU.

3. The digital system of claim 2 being a mobile telecommunications device, further comprising:
   a keyboard connected to the CPU;
   a display connected to the CPU; and
   RF circuitry connected to the CPU.

4. The digital system of claim 1, further comprising a write data buffer connected to the fill buffer and connected to receive write data from the CPU; and
   wherein the fill buffer is connected to merge the contents of the write data buffer into the line of data received from the level 2 memory prior to allocating the line of data to the level 0 cache and to the level 1 cache simultaneously.

5. The digital system of Claim 2, wherein the level 0 cache is connected to a plurality of read request busses from the CPU.

6. The digital system of claim 5, wherein the level 0 cache is connected to a plurality of write request busses from the CPU.

7. The digital system of claim 5 further comprising arbitration circuitry connected to the level 0 cache, the arbitration circuitry operable to select one of the plurality of read requests to access the level 1 cache.

8. The digital system of claim 1 further comprising configuration circuitry connected to the level 0 cache, the configuration circuitry operable to disable the L0 cache.

9. A digital system with a hierarchical memory system, comprising:
   means for determining if an address of a write request hits in a first cache level of the hierarchical memory system in response to receiving the write request;
   means for determining if the address of the write request hits in a second cache level of the hierarchical memory;

means for obtaining a line of data from another level of the hierarchical memory system if the address of the write request does not hit in either the first cache level or in the second cache level;

means for merging write data received with the write request into the line of data;

means for allocating the line of merged data to both the first cache level and to the second cache level simultaneously:

means for receiving a read request;

means for determining if the read request is within the line of data being obtained from the higher level of the hierarchical memory system; and means for providing the read requested data to a requester prior to allocating the line of data.

10. A method of operating a hierarchical memory system, comprising:

receiving a read request;

determining if requested data is available in a first cache level of the hierarchical memory system in response to receiving the read request;

determining if the requested data is available in a second cache level of the hierarchical memory system;

obtaining a line of data containing the requested data from a higher level of the hierarchical memory system if the requested data is not available in either the first cache level or in the second cache level;

allocating the line of data to both the first cache level and to the second cache level simultaneously; and providing the requested data to a requester prior to allocating the line of data.

11. A method of operating a hierarchical memory system, comprising:

receiving a read request;

determining if requested data is available in a first cache level of the hierarchical memory system in response to receiving the read request;

determining if the requested data is available in a second cache level of the hierarchical memory system;

obtaining a line of data containing the requested data from a higher level of the hierarchical memory system if the requested data is not available in either the first cache level or in the second cache level;

allocating the line of data to both the first cache level and to the second cache level simultaneously;

receiving a second read request;

determining if the second read request is within the line of data being obtained from the higher level of the hierarchical memory system; and providing the second requested data to the requester prior to allocating the line of data.

12. The method of Claim 11, wherein simultaneously means on a same clock cycle.

13. The method of claim 11, further comprising if the second request is determined to be within the line of data being obtained from the higher level of the hierarchical memory system, then proceeding without determining if the second requested data is available in the second cache level of the hierarchical memory system.

14. A method of operating a hierarchical memory system, comprising:

receiving a write request;

determining if requested data is available in a first cache level of the hierarchical memory system in response to receiving the write request;

determining if the requested data is available in a second cache level of the hierarchical memory system;

obtaining a line of data containing the requested data from a higher level of the hierarchical memory system if the requested data is not available in either the first cache level or in the second cache level; and merging write data received with the write request into the obtained line of data prior to allocating the line of data to both the first cache level and to the second cache level simultaneously.

15. A method of operating a hierarchical memory system, comprising:

receiving a write request;

determining if requested data is available in a first cache level of the hierarchical memory system in response to receiving the write request;

determining if the requested data is available in a second cache level of the hierarchical memory system;

obtaining a line of data containing the requested data from a higher level of the hierarchical memory system if the requested data is not available in either the first cache level or in the second cache level;

allocating the line of data to both the first cache level and to the second cache level simultaneously;

receiving a read request;

determining if the read request is within the line of data being obtained from the higher level of the hierarchical memory system; and providing the read requested data to a requester prior to allocating the line of data.

16. The method of claim 15, further comprising if the read request is determined to be within the line of data being obtained from the higher level of the hierarchical memory system, then proceeding without determining if the read requested data is available in the second cache level of the hierarchical memory system.

* * * * *